(12) United States Patent
Chang

(10) Patent No.: US 9,102,376 B1
(45) Date of Patent: Aug. 11, 2015

(54) BICYCLE QUICK RELEASE LOCK

(71) Applicant: Vulcan Sports Co., Ltd., Changhua (TW)

(72) Inventor: Chin Shu Chang, Changhua (TW)

(73) Assignee: VULCAN SPORTS CO., LTD., Changhua (TW)

( * ) Notice: Subject to any disclaimer, the term of this patent is extended or adjusted under 35 U.S.C. 154(b) by 0 days.

(21) Appl. No.: 14/577,762

(22) Filed: Dec. 19, 2014

(51) Int. Cl.
*E05B 71/00* (2006.01)
*B62H 5/14* (2006.01)
*B62H 5/00* (2006.01)
*E05B 65/00* (2006.01)
*E05B 29/00* (2006.01)

(52) U.S. Cl.
CPC ............... *B62H 5/145* (2013.01); *B62H 5/001* (2013.01); *E05B 29/00* (2013.01); *E05B 65/00* (2013.01); *E05B 71/00* (2013.01)

(58) Field of Classification Search
CPC .... B62K 2206/00; B62K 25/00; B62K 19/30; B60B 21/062; B62J 1/08; E05B 67/003
USPC ..................... 70/14, 18, 30, 49, 58, 225, 226, 70/229–233
See application file for complete search history.

(56) References Cited

U.S. PATENT DOCUMENTS

| | | | | |
|---|---|---|---|---|
| 4,028,916 A * | 6/1977 | Pender | ............................. | 70/233 |
| 4,068,504 A * | 1/1978 | Pickard | ............................. | 70/18 |
| 4,112,720 A * | 9/1978 | Green | ............................. | 70/233 |
| 4,405,161 A * | 9/1983 | Young et al. | ..................... | 285/80 |
| 4,426,861 A * | 1/1984 | Chillis | ............................. | 70/39 |
| 4,951,487 A * | 8/1990 | Sheils Dennis | ................. | 70/233 |
| 5,005,390 A * | 4/1991 | Giannini et al. | ................ | 70/225 |
| 5,027,628 A * | 7/1991 | De Rocher et al. | ............ | 70/233 |
| 5,337,587 A * | 8/1994 | Davidson | ........................ | 70/233 |
| 5,491,992 A * | 2/1996 | Mandall | ........................ | 70/232 |
| 5,511,399 A * | 4/1996 | Lynn | ................................. | 70/19 |
| 5,709,113 A * | 1/1998 | Godfrey | ......................... | 70/233 |
| 5,718,134 A * | 2/1998 | Chang | ............................. | 70/233 |
| 5,873,271 A * | 2/1999 | Smith | ............................. | 70/58 |
| 5,889,463 A * | 3/1999 | Judd et al. | ..................... | 340/427 |
| 6,167,735 B1* | 1/2001 | Brown | ............................. | 70/19 |
| 6,425,509 B1* | 7/2002 | Dean et al. | ..................... | 224/324 |
| 6,601,712 B2* | 8/2003 | Dean et al. | ..................... | 211/20 |
| 6,948,878 B1* | 9/2005 | Smith et al. | ..................... | 403/110 |
| RE38,873 E * | 11/2005 | Denby et al. | .................... | 70/233 |
| 7,076,978 B2* | 7/2006 | Denby | ............................ | 70/233 |
| 7,661,280 B1* | 2/2010 | Weyland | ......................... | 70/233 |
| 8,083,112 B2* | 12/2011 | Kuo | ............................... | 224/425 |
| 8,176,759 B2* | 5/2012 | Katz et al. | ...................... | 70/233 |
| 8,202,017 B2* | 6/2012 | Shalaby | ..................... | 403/322.4 |
| 8,839,772 B2* | 9/2014 | Lee | ................................. | 124/86 |
| 2005/0044910 A1* | 3/2005 | Sloan | ............................. | 70/446 |
| 2007/0101779 A1* | 5/2007 | Muerza | ........................ | 70/233 |
| 2014/0305175 A1* | 10/2014 | Irwin | ............................. | 70/14 |

FOREIGN PATENT DOCUMENTS

FR            2566824 A1 *  1/1986  ............. E05B 67/00

* cited by examiner

*Primary Examiner* — Suzanne Barrett
(74) *Attorney, Agent, or Firm* — Guice Patents PLLC

(57) ABSTRACT

The invention relates to a bicycle quick release lock, which is consisted of a body, a fit seat, a lock cylinder module, a push button, a clamping block, an external lock block, a locating seat, a slide plate and an outer hook piece. By the composition of above structure, a part of a quick release handle connected to a seat tube and a middle tube of a bicycle seat may be locked, and a linked locking mechanism of an external lock latch may be provided simultaneously, to thereby achieve the purpose of preventing theft from bicycle seat, front and rear wheel or other objects within a bicycle.

6 Claims, 11 Drawing Sheets

BICYCLE QUICK RELEASE LOCK

BACKGROUND OF THE INVENTION a) Field of the Invention

The invention relates to a bicycle quick release lock and, more particularly, a quick release lock with a quick release handle of a bicycle seat and an linked external lock latch, to thereby achieve the purpose of preventing theft from bicycle seat, front and rear wheel or other objects within a bicycle.

b) Description of the Prior Art

In order to conveniently adjust seat height of bicycles, replace and repair of front and rear wheels, a quick release handle may be used as a connecting component connected to the part connected to a frame, to thereby perform assembling and replacing operation conveniently. Although the quick release handles bring great convenience, some new problems are caused. Namely, when a bicycle is stopped outside, a thief may quickly remove a seat and front and rear wheels from bicycle frame by easily loosing the quick release handle. In order to prevent bicycle objects theft, owners buy bicycle locks used as security facilities of the bicycle objects.

However, the problem is that various bicycle locks sold in the market are mostly provided for locking the whole bicycle. Wherein front and rear wheels, the purpose of locking to prevent theft may be achieve through wearing a cable. But there is no space for a cable to wear around the seat, so that some owner removes the seat by using the quick release connection of the quick release handle when stopping, and carries it with him, so it is really inconvenient. For this reason, the industry develops a so-called quick release lock, wherein a lock is added in a quick release handle directly to fasten the seat. However, the structure of this kind of quick release lock is only for preventing theft of the seat, no for other bicycle objects, such as front and rear wheels and the whole bicycle. Therefore, for the purpose of preventing theft, at least one lock should be added, so that it is very troublesome to lock, the cost of buying locks is increased, and it is also troublesome for riders to put so many locks during riding.

SUMMARY OF THE INVENTION

In view of this, the inventor finally completes the quick release lock of the present invention after numerous improvements, namely, the object of the present invention is to provide a quick release lock with a quick release handle of a bicycle seat and an linked external lock latch, to thereby achieve the purpose of preventing theft from bicycle seat, front and rear wheel or other objects within a bicycle.

To achieve the above object according to the invention, a quick release lock of the present invention is consisted of a body, a fit seat, a lock cylinder module, a push button, a clamping block, an external lock block, a locating seat, a slide plate and an outer hook piece, wherein:

the body, which is consisted of an upper housing, a lower housing and a first inner housing, an inner containing space and a containing groove are set inside the upper housing, the containing groove is communicated to a ball groove, a push button mounting hole and a latch inserting hole are set on a side of the upper housing, the latch inserting hole is provided for an external lock latch of a flexible body to lock, a first inserting space and a second inserting space are separately set on two sides inside the upper housing, the first inner housing is fit on the inner side of the upper housing, a first inner concave space is set on an inner side of the first inner housing, the lower housing is covered on the bottom of the upper housing;

the fit seat, which is correspondingly fastened to the body, is consisted of an outer housing and a second inner housing, an inner containing space is set on the outer housing, a first side plate is extended from a side of the outer housing, a first engaging teeth set is set on a side of the first side plate, a second side plate is extended from another side of the outer housing, a second engaging teeth set is set on a side of the second side plate, the second inner housing is fit on the inner side of the outer housing, a second concave space is set on an inner side of the second inner housing;

the lock cylinder module, which is placed inside the body, includes a lock cylinder, a torsion spring and a driving rod, a lock bolt is set on a front end of the lock cylinder, the torsion spring is set located at the front end of the lock cylinder, a fitting groove is set on a rear end of the driving rod, the fitting groove is provided for the lock bolt to fit, a guiding part is concavely set in the middle section of the driving rod, an eccentric rod is set in the front section of the driving rod;

the push button, which is placed inside the push button mounting hole, an engaging groove is set on its one side for the eccentric rod to engage, a first pushing inclined plane and a first spring containing groove are set on a front side of the push button, a first spring is placed inside the first containing groove;

the clamping block, which is placed in front of the push button, a second pushing inclined plane and at least an engaging teeth are set on a side of the clamping block, the second pushing inclined plane is corresponded to the first pushing inclined plane, a side block is set convexly on a side of the clamping block, a second containing groove is set on the side block, a second spring is placed inside the second containing groove;

the external lock block, which is placed inside the containing groove of the upper housing, a bottom of the external lock block is touched to the guiding part of the driving rod, at least a third spring containing groove is set on a top of the external lock block, a third spring is placed inside the third containing groove, a semi-circular groove set on a side of the external lock block is provided for a ball sliding between the semi-circular groove and the ball groove;

the locating seat, a concave groove corresponding to the latch inserting hole is set on its top, and a part is formed for an external lock latch of the flexible body to insert and be placed inside;

the slide plate, its front end part is pushed by the push button, a hook groove is concavely set on a rear end of the slide plate;

the outer hook piece, which includes a shaft hole, the shaft hole is fit with a shaft bolt of the upper housing, a hook is set on a side of the outer hook piece, the hook is pushed to be fixed with the first engaging teeth set by the elasticity of a fourth spring, an engaging end is set on another side of the outer hook piece, the engaging end is embedded into the hook groove of the slide plate.

The above first concave space, wherein two first limiting hole edges are respectively set on its upper and lower edges.

The above second concave space, wherein two second limiting hole edges are respectively set on its upper and lower edges.

DETAILED DESCRIPTION OF THE INVENTION

Figure 1:
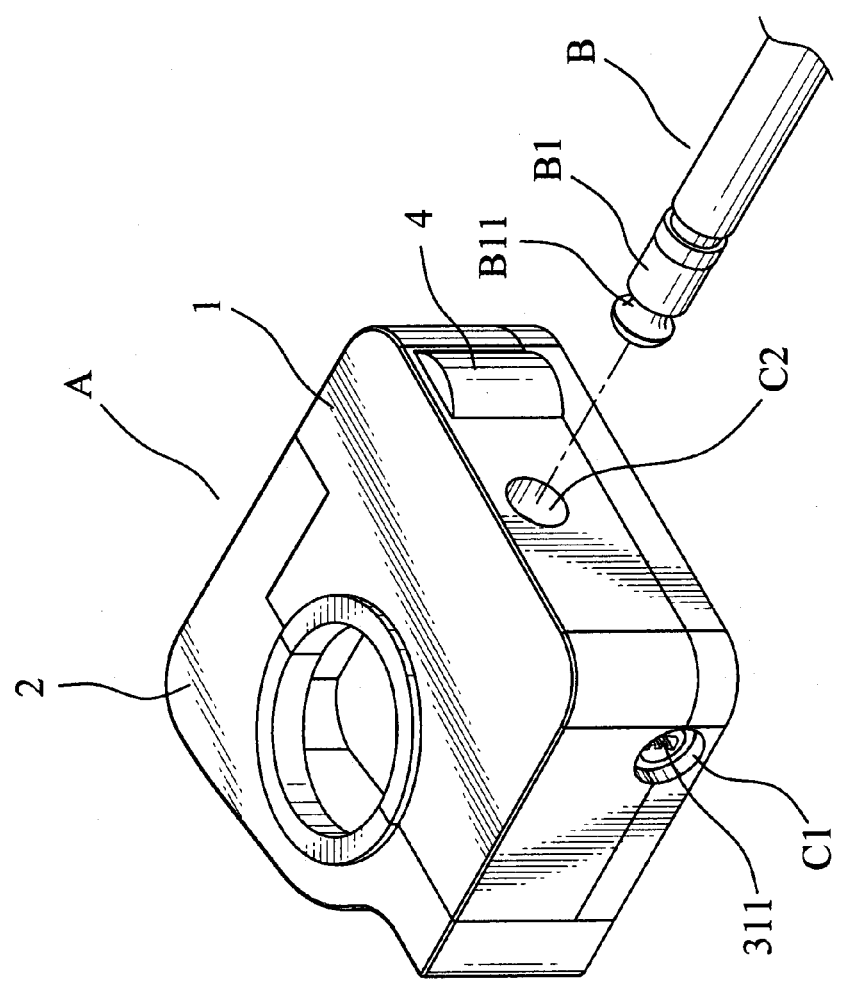
FIG. 1 is a three-dimensional schematic diagram of the present invention.
Figure 2:
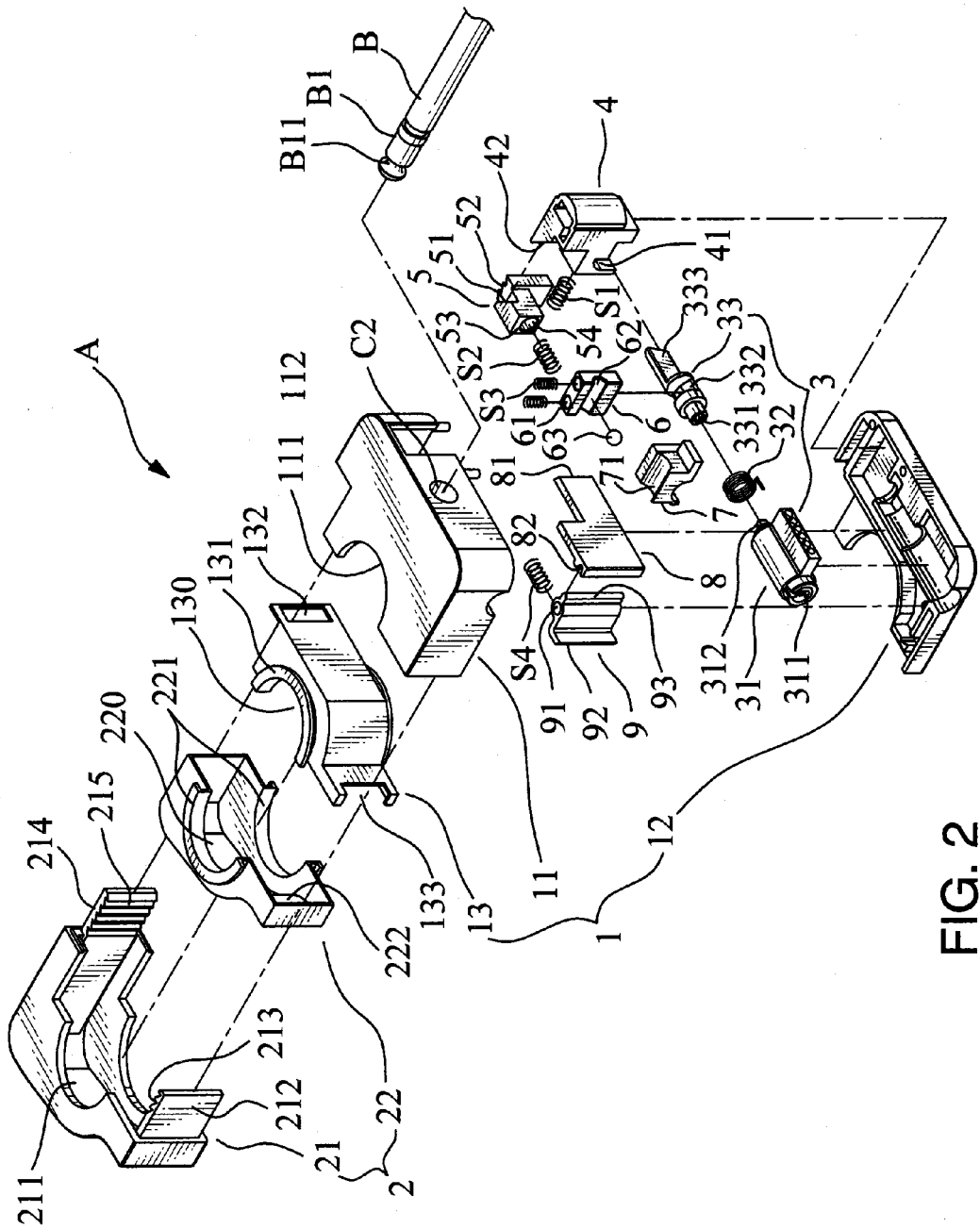
FIG. 2 is a three-dimensional exploded diagram of the present invention.
Figure 3:
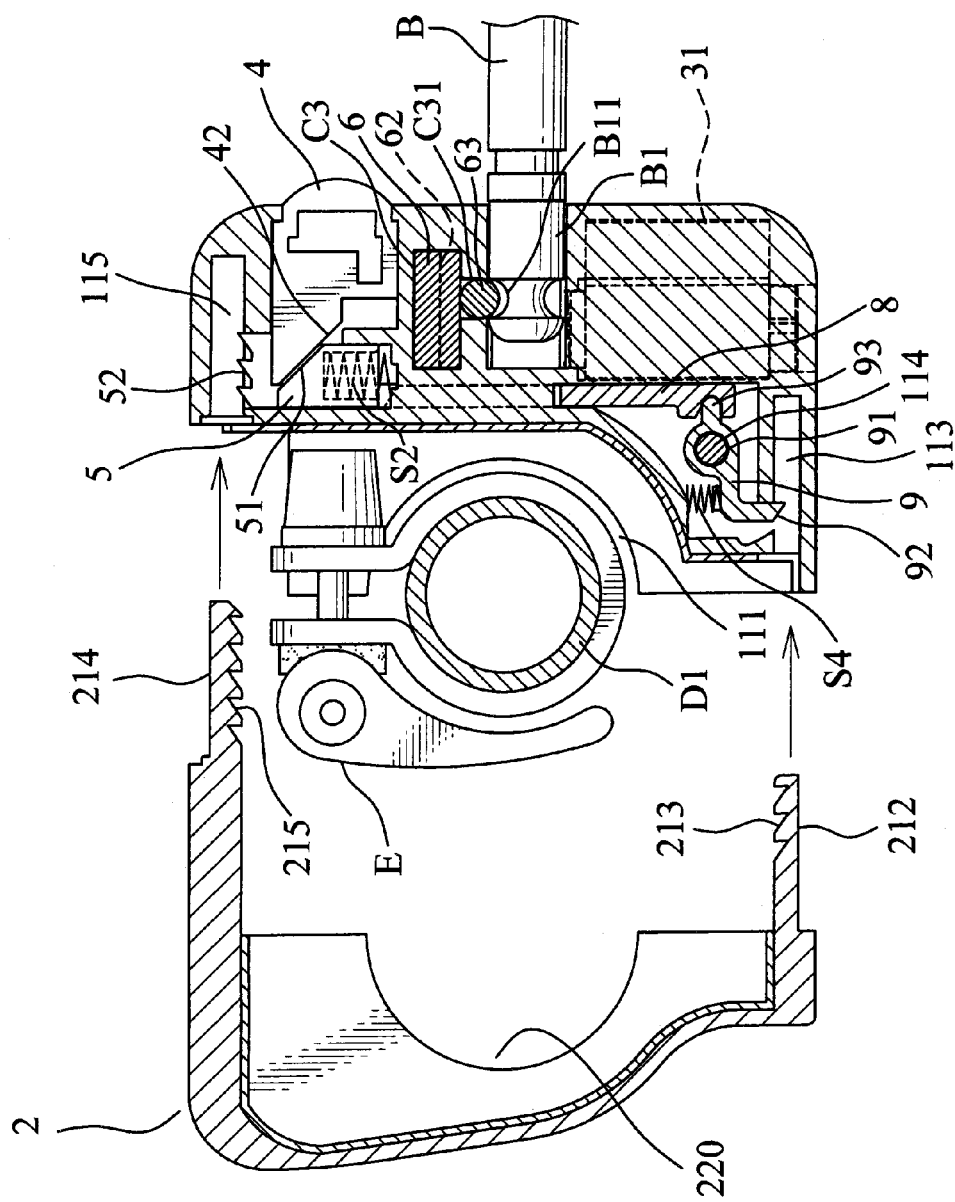
FIG. 3 is a schematic diagram of the locking operation of the present invention.
Figure 4:
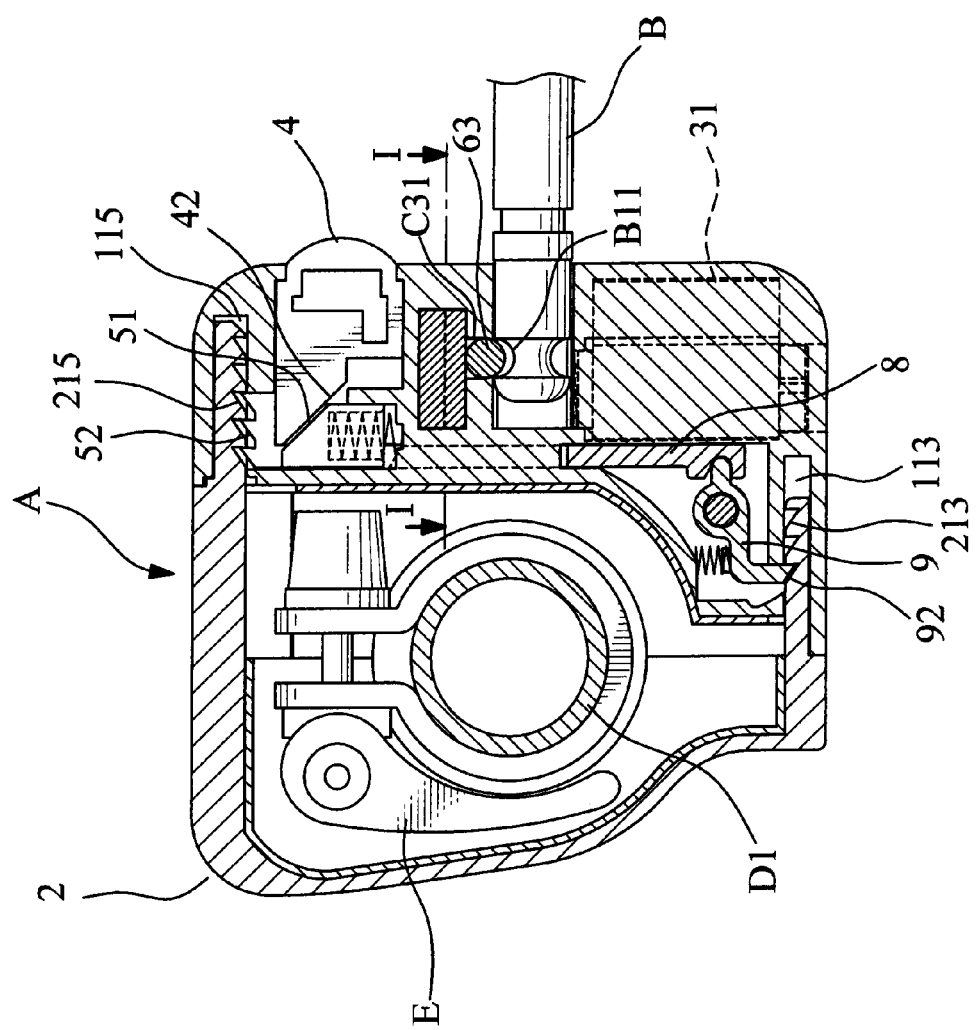
FIG. 4 is a schematic diagram (1) of the lock mode of the present invention.
Figure 5:
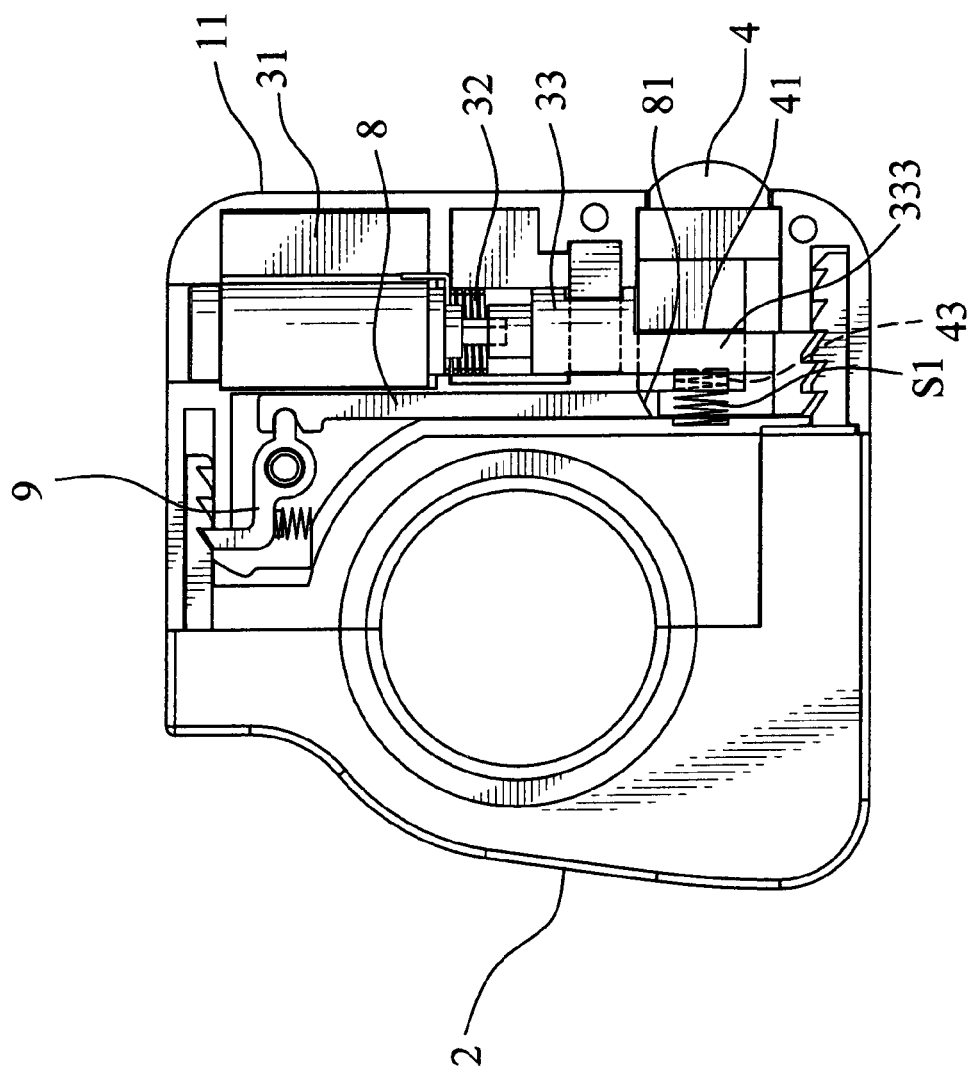
FIG. 5 is a schematic diagram (2) of the lock mode of the present invention.
Figure 6:
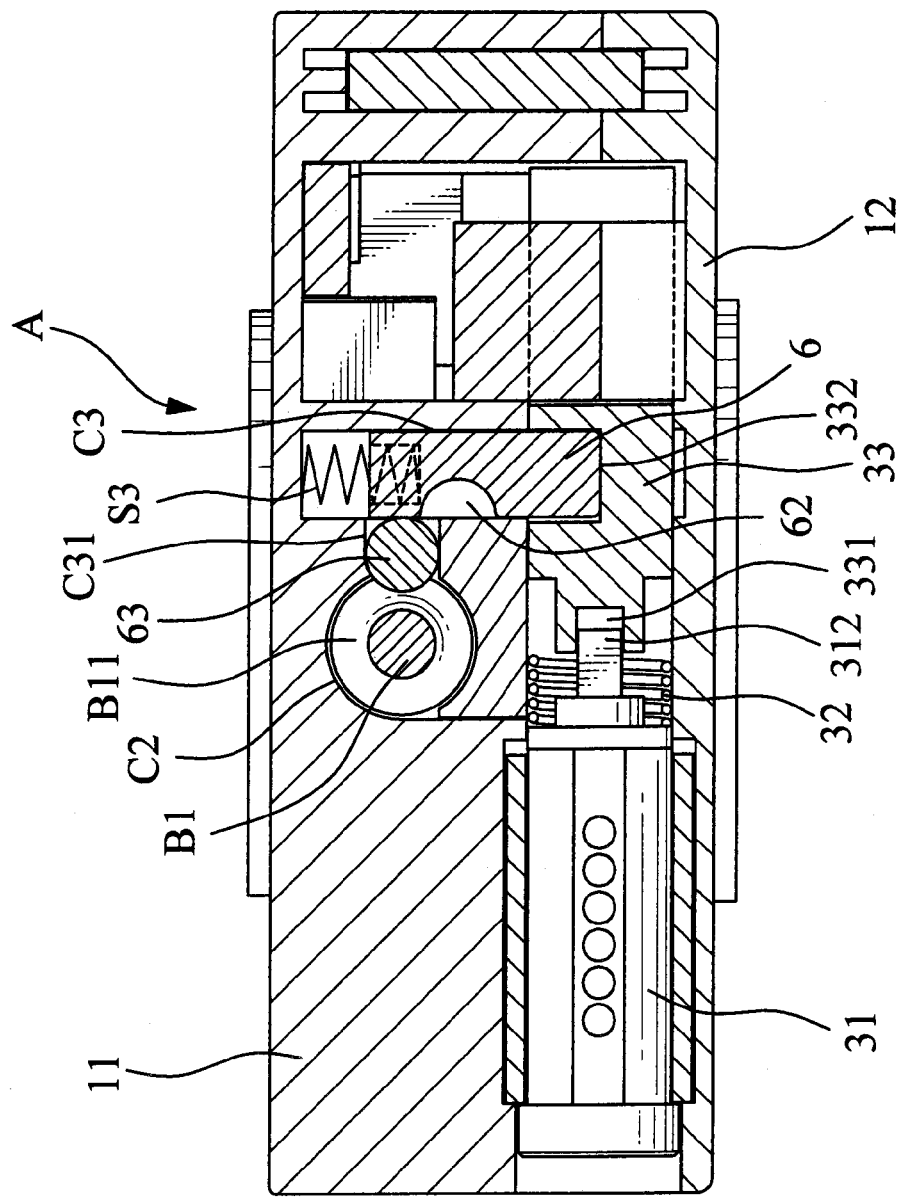
FIG. 6 is a schematic diagram of locking with the linked external lock latch of the present invention.
Figure 7:
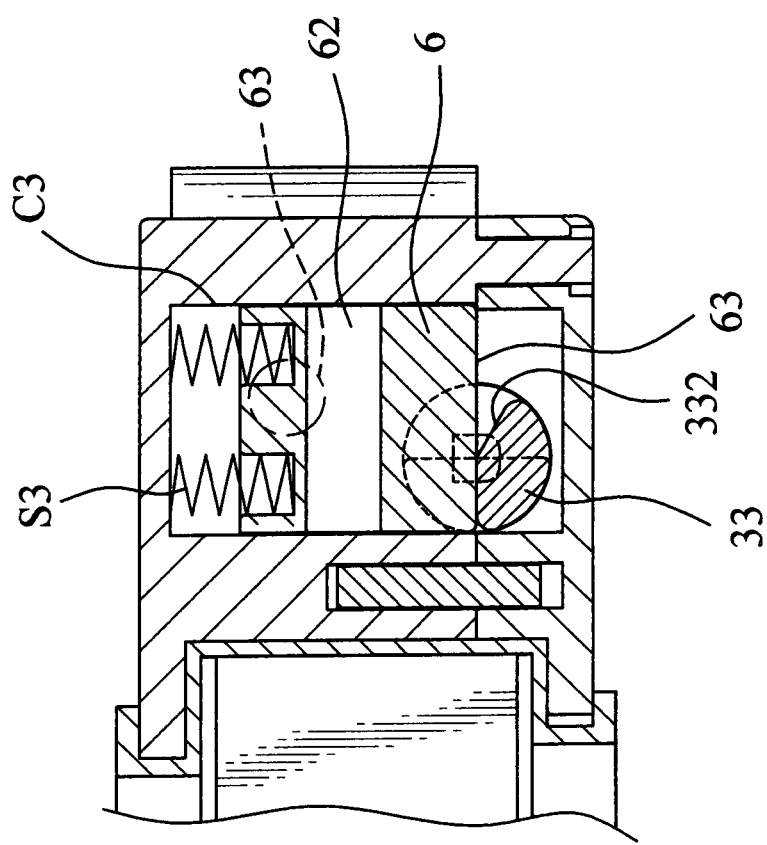
FIG. 7 is a cross-sectional schematic diagram of FIG. 4 of the present invention.

Please refer to FIG. 1 to FIG. 5, a quick release lock A of the present invention is consisted of a body 1, a fit seat 2, a lock cylinder module 3, a push button 4, a clamping block 5, an external lock block 6, a locating seat 7, a slide plate 8 and an outer hook piece 9, wherein:

the body 1, which is consisted of an upper housing 11, a lower housing 12 and a first inner housing 13, a through hole C1 is set on a side of the body 1, an inner containing space 111 and a containing groove C3 are set inside the upper housing 11, the containing groove C3 is communicated to a ball groove C31, a push button mounting hole 112 and a latch inserting hole C2 are set on a side of the upper housing 11, the latch inserting hole C2 is provided for an external lock latch B1 of a flexible body B to lock, a first inserting space 113 and a second inserting space 115 are separately set on two sides inside the upper housing 11, the first inner housing 13 is fit on the inner side of the upper housing 11, a first inner concave space 130 is set on an inner side of the first inner housing 13, two first limiting hole edges 131 are respectively set on upper and lower edges of the first concave space 130, a first hole 132 is set on a side of the first inner housing 13, a notch 133 is set on another side corresponding to the first hole 132, the lower housing is covered on the bottom of the upper housing;

the fit seat 2, which is correspondingly fastened to the body 1, is consisted of an outer housing 21 and a second inner housing 22, an inner containing space 211 is set on the outer housing 21, a first side plate 212 is extended from a side of the outer housing 21, a first engaging teeth set 213 is set on a side of the first side plate 212, a second side plate 214 is extended from another side of the outer housing 21, a second engaging teeth set 215 is set on a side of the second side plate 214, the second inner housing 22 is fit on the inner side of the outer housing 21, a second concave space 220 is set on an inner side of the second inner housing 22, two second limiting hole edges 221 are respectively set on upper and lower edges of the second concave space 220, the second limiting hole edge 221 is corresponded to the first limiting hole edge 131, a second hole 222 is set on a side of the second inner housing 22;

the lock cylinder module 3, which is placed inside the body 1, includes a lock cylinder 31, a torsion spring 32 and a driving rod 33, the lock cylinder 31 includes a key inserting hole 311 communicated to the inserting hole C1, a lock bolt 312 is set on a front end of the lock cylinder 31, the torsion spring 32 is set located at the front end of the lock cylinder 31 (the structure and motion of the lock cylinder 31 and the torsion spring 32 are prior art, so not described here in details), a fitting groove 331 is set on a rear end of the driving rod 33, the fitting groove 331 is provided for the lock bolt 312 to fit, a guiding part 332 is concavely set in the middle section of the driving rod 33, an eccentric rod 333 is set in the front section of the driving rod 33;

the push button 4, which is placed inside the push button mounting hole 112, an engaging groove 41 is set on its one side for the eccentric rod 333 to engage, a first pushing inclined plane 42 and a first spring containing groove 43 are set on a front side of the push button 4, a first spring S1 is placed inside the first containing groove 43;

the clamping block 5, which is placed in front of the push button 4, a second pushing inclined plane 51 and at least an engaging teeth 52 are set on a side of the clamping block 5, the second pushing inclined plane 52 is corresponded to the first pushing inclined plane 42, a side block 53 is set convexly on a side of the clamping block 5, a second containing groove 54 is set on the side block 53, a second spring S2 is placed inside the second containing groove 54;

the external lock block 6, which is placed inside the containing groove C3 of the upper housing 11, a bottom of the external lock block 6 is touched to the guiding part 332 of the driving rod 33, at least a third spring containing groove 61 is set on a top of the external lock block 6, a third spring S3 is placed inside the third containing groove 61, a semi-circular groove 62 set on a side of the external lock block 6 is provided for a ball 63 sliding between the semi-circular groove 62 and the ball groove C31 (as shown in FIG. 6 and FIG. 7);

the locating seat 7, a concave groove 71 corresponding to the latch inserting hole C2 is set on its top, and a part is formed for an external lock latch B1 of the flexible body B to insert and be placed inside;

the slide plate 8, its front end part 81 is pushed by the push button 4, a hook groove 82 is concavely set on a rear end of the slide plate 8;

the outer hook piece 9, which includes a shaft hole 91, the shaft hole 91 is fit with a shaft bolt 114 of the upper housing 11, a hook 92 is set on a side of the outer hook piece 9, the hook 92 is pushed to be fixed with the first engaging teeth set 213 by the elasticity of a fourth spring S4, an engaging end 93 is set on another side of the outer hook piece 9, the engaging end 93 is embedded into the hook groove 82 of the slide plate 8.

By the composition of the above structure, during locking operation (please refer to FIG. 3, FIG. 4, FIG. 5, FIG. 7), a quick release handle E connected to a seat tube D1 of a seat of a bicycle D is set surrounded by the body 1 and the fit seat 2, a first side plate 212 and the second side plate 214 are simultaneously inserted to the first inserting space 113 and the second inserting space 115 respectively. Since the first engaging teeth set 213 and the second engaging teeth set 215 are one-way helical tooth, the first engaging teeth set 213 may be one-way engaged by the hook 92 with pushing inside, the second engaging teeth set 215 may be one-way engaged by the engaging teeth 52 and pushed to a location that the first limiting hole edge 131 and the second limiting hole edge 221 are completely aligned, and then the locking operation is complete. At this time, the quick release handle E is surrounded by the body 1 and the fit seat 2, a thief cannot remove the quick release handle E, so that the purpose of preventing the seat for theft may be achieved.

Figure 8:
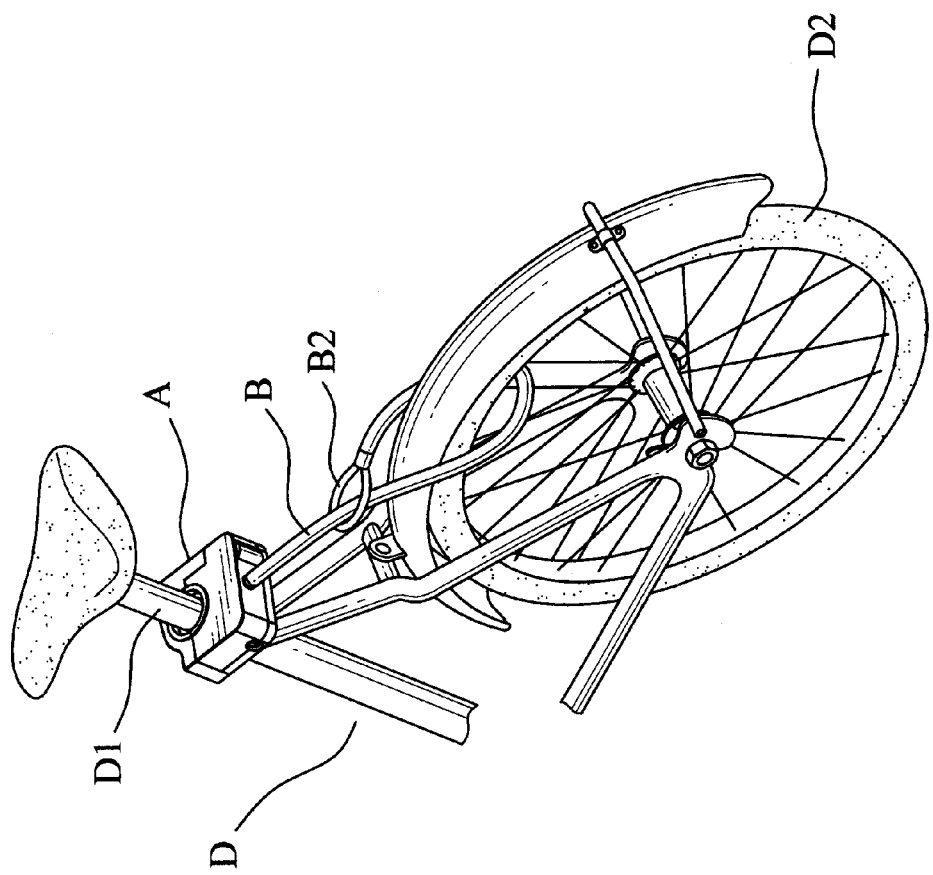
FIG. 8 is a three-dimensional schematic diagram of the embodiment of the present invention.

Please refer to FIG. 8, the quick release lock A of the present invention may be used to lock with an external lock latch B1 having a flexible body B, to prevent theft for front and rear wheels or other bicycle objects. Also, the whole bicycle D may be locked at a stopping column by using the flexible body B with the external lock latch B1 set on an end of and a collar B2 set on another end. Wearing around a wheel D2 (such as a front wheel or a rear wheel) and a stopping column with one end of the external lock latch B1, passing the external lock latch B1 through the collar B2, and then inserting the external lock latch B1 into the latch inserting hole C2. At this time, the ball 63 is engaged into a slot B11 of the external lock latch B1. Lastly, rotating a key to drive the guiding part 332 of the driving rod 33 to move the external lock block 6 downwards and the ball 63 sliding out from the semi-circular groove 62, and the ball 63 enters into the ball groove C31 to form a locking mode (as shown in FIG. 6 and FIG. 7), And then, removing the key K, the locking operation of connecting the external lock latch B1 and the quick release lock A is completed.

Figure 9:
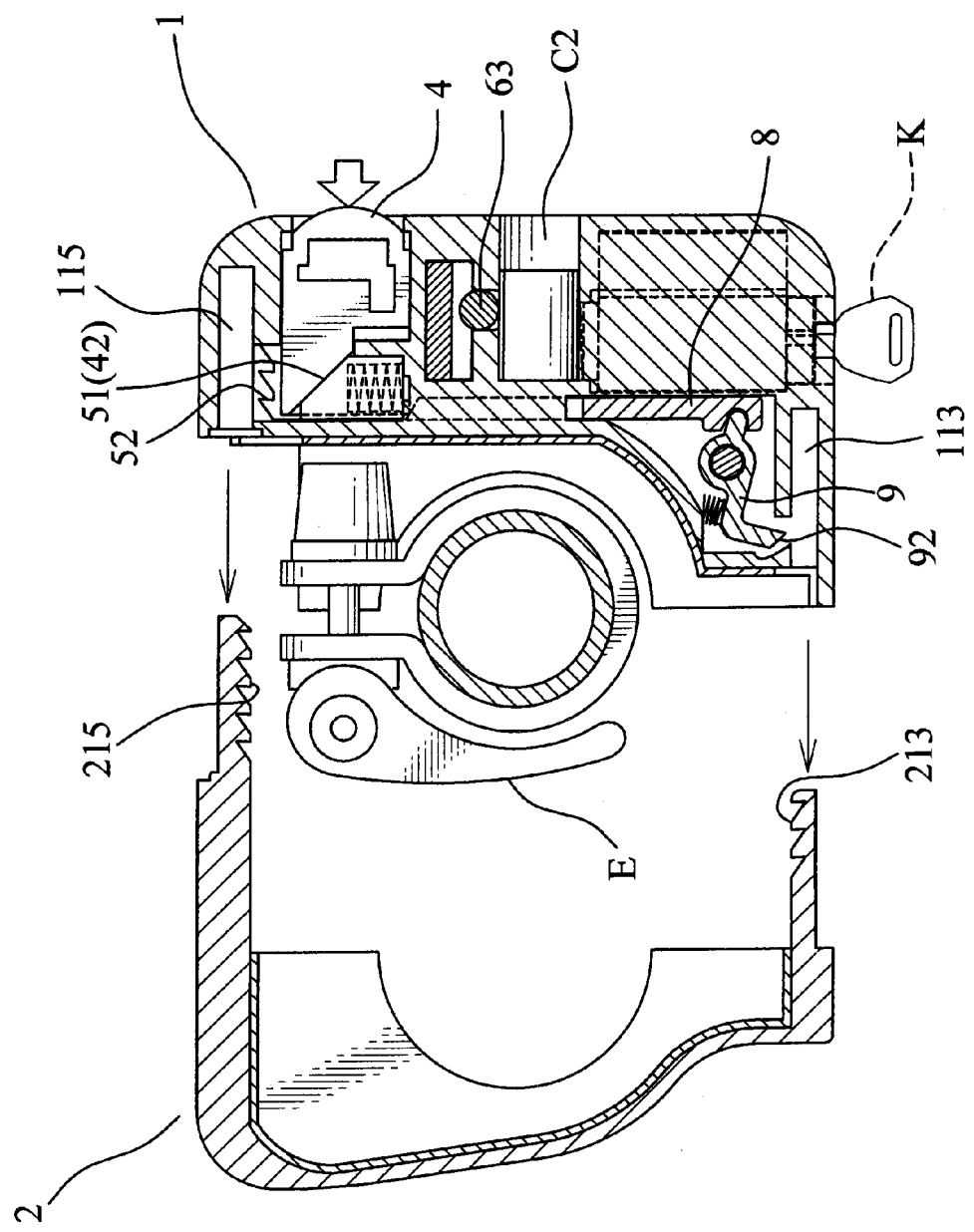
FIG. 9 is a schematic diagram of the unlocking operation of the present invention.
Figure 10:
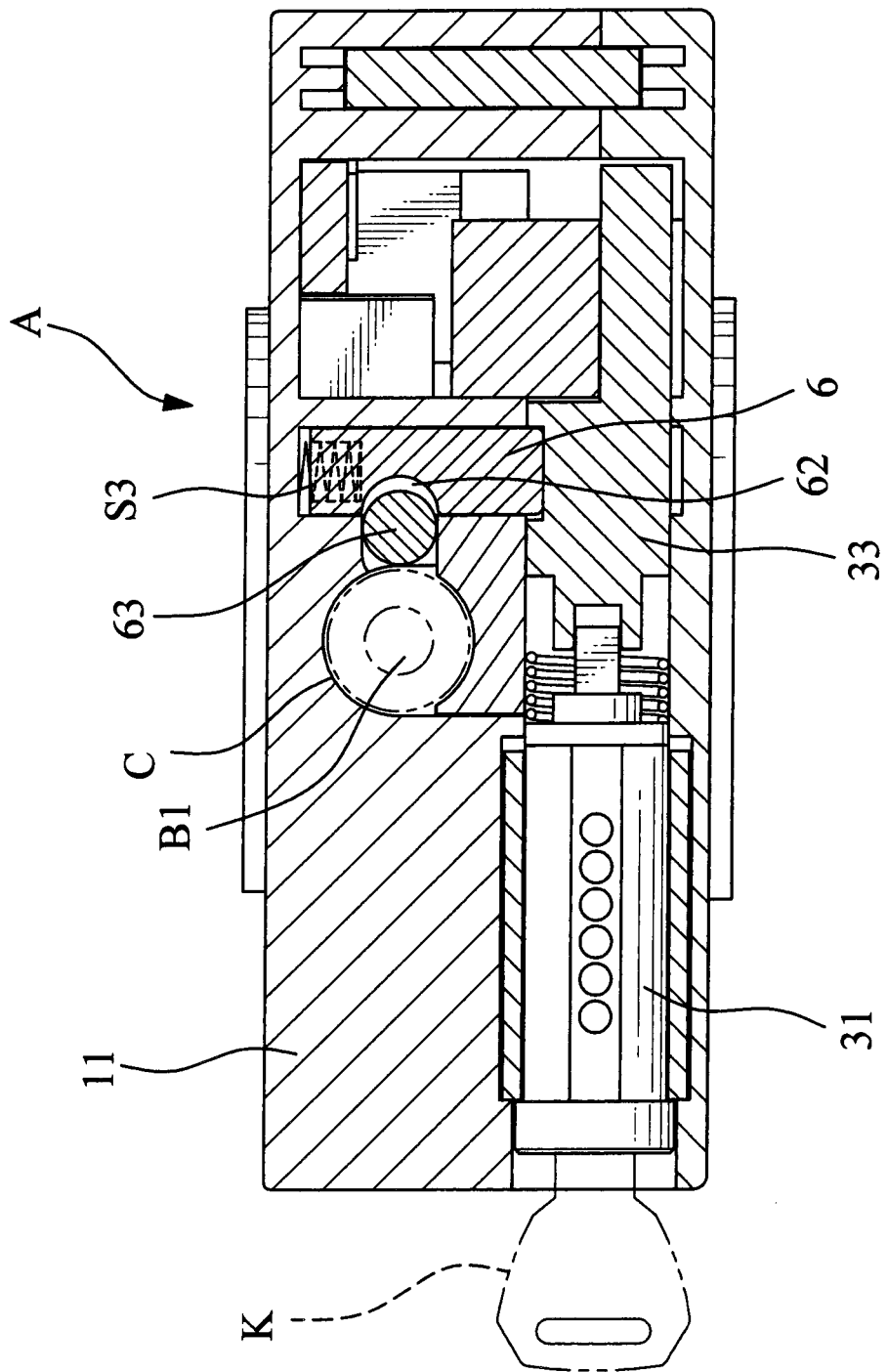
FIG. 10 is a schematic diagram of unlocking the linked external lock latch and the present invention.
Figure 11:
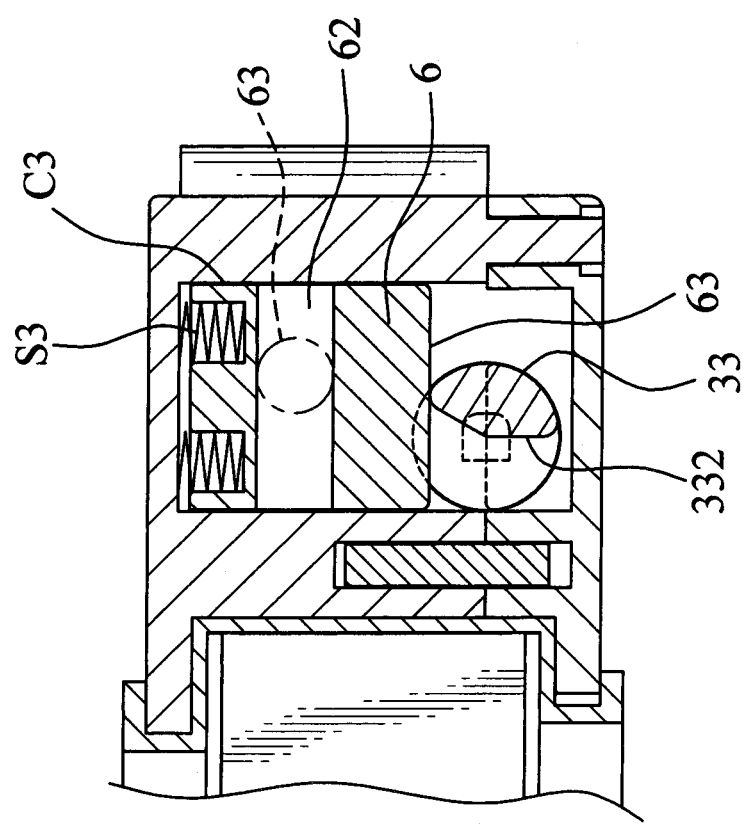
FIG. 11 is a partial schematic diagram of the unlocking operation of the external lock block of the present invention.

During unlocking operation (please refer FIG. 9 and FIG. 10), inserting the key K into the key inserting hole 311 and rotating the lock cylinder 31 to drive the driving rod 33, the guiding part 332 pushes the external lock block upwards, the ball 63 slides into the semi-circular groove 62 and disengages the slot B11 of the external lock latch B1 to form a unlocking mode (as shown in FIG. 11), the eccentric rod 333 on the front section of the driving rod 33 rotates simultaneously. Pushing the push button 4 by fingers to link up the second pushing inclined plane 51 of the clamping block 5 touching the first pushing inclined plane 42 to move, the second engaging teeth set 215 is not engaged by the engaging teeth 52, the front end of the push button 4 pushes the front end part 81 of the slide plate 8 simultaneously and links the hook 92 of the outer hook piece 9 not to engage the first engaging teeth set 213, so that the fit seat 2 may be remove from the body 1, and the unlocking operation is completed.

What is claimed is:

1. A quick release lock, which is consisted of a body, a fit seat, a lock cylinder module, a push button, a clamping block, an external lock block, a locating seat, a slide plate and an outer hook piece, wherein:
    the body, which is consisted of an upper housing, a lower housing and a first inner housing, an inner containing space and a containing groove are set inside the upper housing, the containing groove is communicated to a ball groove, a push button mounting hole and a latch inserting hole are set on a side of the upper housing, the latch inserting hole is provided for an external lock latch of a flexible body to lock, a first inserting space and a second inserting space are separately set on two sides inside the upper housing, the first inner housing is fit on the inner side of the upper housing, a first inner concave space is set on an inner side of the first inner housing, the lower housing is covered on the bottom of the upper housing;
    the fit seat, which is correspondingly fastened to the body, is consisted of an outer housing and a second inner housing, an inner containing space is set on the outer housing, a first side plate is extended from a side of the outer housing, a first engaging teeth set is set on a side of the first side plate, a second side plate is extended from another side of the outer housing, a second engaging teeth set is set on a side of the second side plate, the second inner housing is fit on the inner side of the outer housing, a second concave space is set on an inner side of the second inner housing;
    the lock cylinder module, which is placed inside the body, includes a lock cylinder, a torsion spring and a driving rod, a lock bolt is set on a front end of the lock cylinder, the torsion spring is set located at the front end of the lock cylinder, a fitting groove is set on a rear end of the driving rod, the fitting groove is provided for the lock bolt to fit, a guiding part is concavely set in the middle section of the driving rod, an eccentric rod is set in the front section of the driving rod;
    the push button, which is placed inside the push button mounting hole, an engaging groove is set on its one side for the eccentric rod to engage, a first pushing inclined plane and a first spring containing groove are set on a front side of the push button, a first spring is placed inside the first containing groove;
    the clamping block, which is placed in front of the push button, a second pushing inclined plane and at least an engaging teeth are set on a side of the clamping block, the second pushing inclined plane is corresponded to the first pushing inclined plane, a side block is set convexly on a side of the clamping block, a second containing groove is set on the side block, a second spring is placed inside the second containing groove;
    the external lock block, which is placed inside the containing groove of the upper housing, a bottom of the external lock block is touched to the guiding part of the driving rod, at least a third spring containing groove is set on a top of the external lock block, a third spring is placed inside the third containing groove, a semi-circular groove set on a side of the external lock block is provided for a ball sliding between the semi-circular groove and the ball groove;
    the locating seat, a concave groove corresponding to the latch inserting hole is set on its top, and a part is formed for an external lock latch of the flexible body to insert and be placed inside;
    the slide plate, its front end part is pushed by the push button, a hook groove is concavely set on a rear end of the slide plate;
    the outer hook piece, which includes a shaft hole, the shaft hole is fit with a shaft bolt of the upper housing, a hook is set on a side of the outer hook piece, the hook is pushed to be fixed with the first engaging teeth set by the elasticity of a fourth spring, an engaging end is set on another side of the outer hook piece, the engaging end is embedded into the hook groove of the slide plate.

2. The quick release lock as claimed in claim 1, wherein two first limiting hole edges are respectively set on upper and lower edges of the first concave space.

3. The quick release lock as claimed in claim 1, wherein two second limiting hole edges are respectively set on upper and lower edges of the second concave space.

4. The quick release lock as claimed in claim 1, wherein a first hole is set on a side of the first inner housing, a notch is set on another side corresponding to the first hole.

5. The quick release lock as claimed in claim 1, wherein a second hole is set on a side of the second inner housing.

6. The quick release lock as claimed in claim 1, wherein the lock cylinder includes a key inserting hole communicated to the inserting hole.

* * * * *